United States Patent

[11] 3,587,309

| [72] | Inventor | Robert E. Jasperson<br>Annapolis, Md. |
|---|---|---|
| [21] | Appl. No. | 832,579 |
| [22] | Filed | June 12, 1969 |
| [45] | Patented | June 28, 1971 |
| [73] | Assignee | Trident Engineering Associates, Inc.,<br>Annapolis, Md. |

[54] AERO-HYDRO INTERFACE MEASURING SYSTEM
8 Claims, 5 Drawing Figs.

| [52] | U.S. Cl. | 73/170 |
|---|---|---|
| [51] | Int. Cl. | G01c 13/00 |
| [50] | Field of Search | 73/170 (o) |

[56] References Cited
UNITED STATES PATENTS

| 3,110,178 | 11/1963 | Marks et al. | 73/170 |
| 3,383,915 | 5/1968 | Gilbert | 73/170 |
| 3,449,950 | 6/1969 | Dale et al. | 73/170 |
| 3,511,092 | 5/1970 | Saunders | 73/170X |

Primary Examiner—James J. Gill
Assistant Examiner—John P. Beauchamp
Attorney—Michael Ebert ABSTRACT: A wave measuring system in which an accelerometer sensor is sealed within a canister suspended by a long lead well below the surface of the sea from a flotation buoy, whereby perturbation of the buoy by wave action is transferred to the canister to produce accelerometer readings which are a function of wave activity.

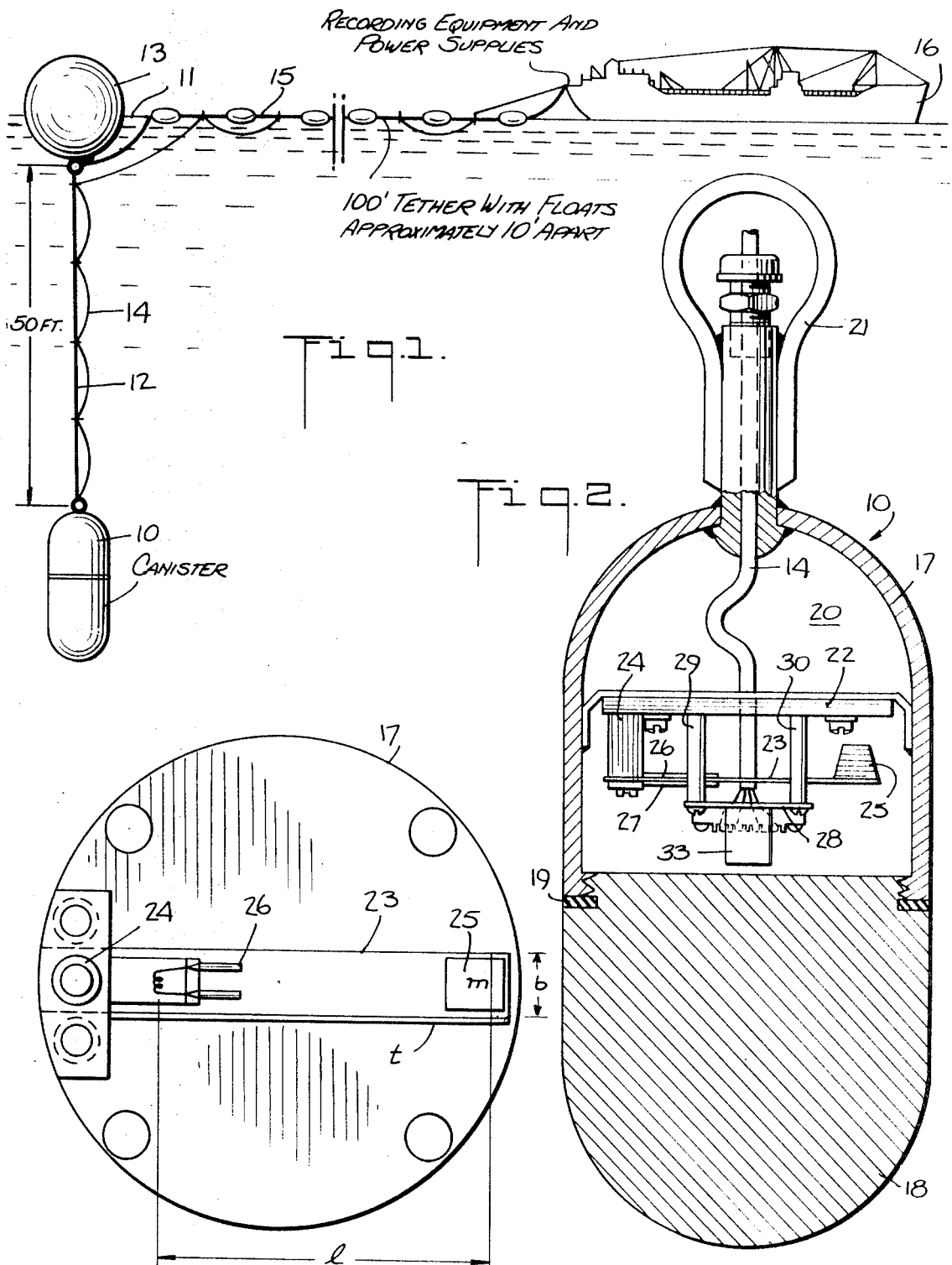

PATENTED JUN 28 1971
3,587,309
SHEET 2 OF 2
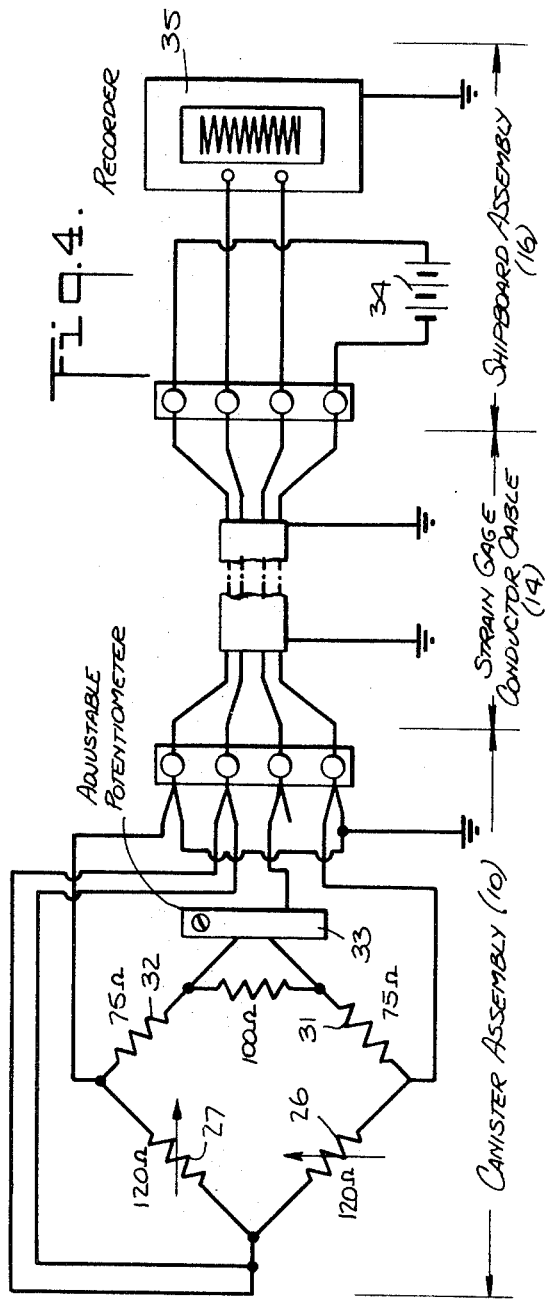
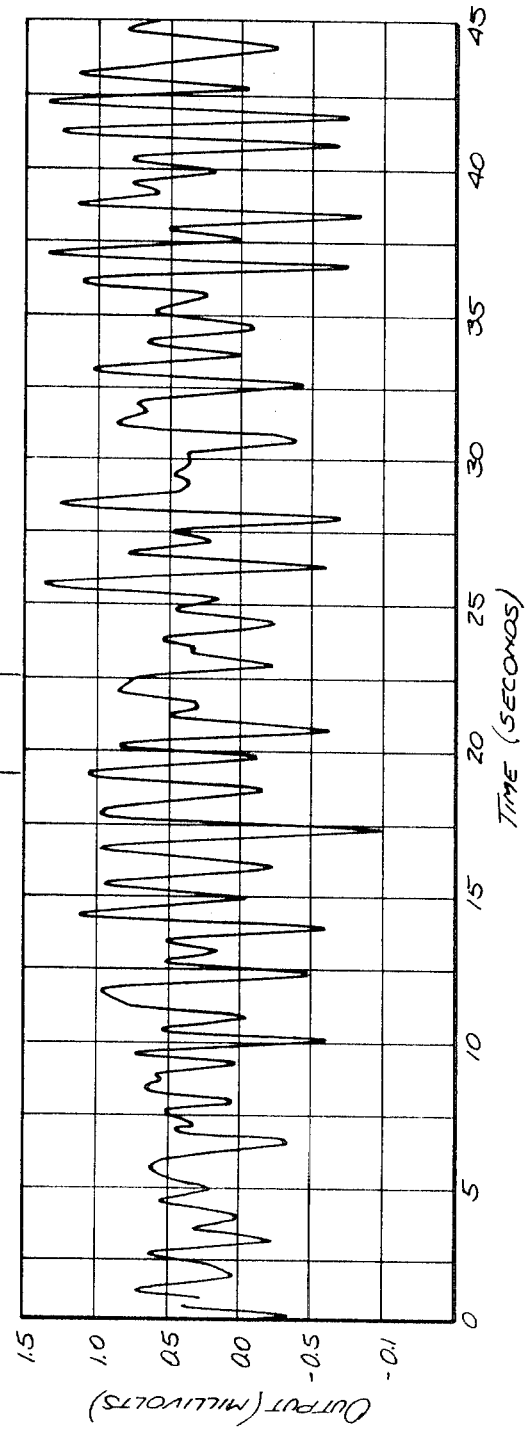
INVENTOR.
ROBERT E. JASPERSON
BY
ATTORNEY

AERO-HYDRO INTERFACE MEASURING SYSTEM

RELATED APPLICATION

This application is related to copending application Ser. No. 519,245, of R. E. Jasperson and A. H. Rice, filed Jan. 7, 1966, entitled "Accelerometers."

BACKGROUND OF INVENTION

This invention relates generally to aero-hydro interface measuring techniques, and more particularly to a low-cost wave measuring system which is adapted accurately to measure the height of ocean waves.

Many situations of practical importance require information in regard to the height and periodicity of waves generated upon the surface of a body of water. Data as to surface wave patterns is, for example, essential in the underwater firing and launching of missiles, in sea-plane landings, as well as in various oceanographic studies. Observation of the state of the sea by the naked eye is notoriously unreliable.

Among instruments heretofore developed to measure wave activity are surface buoys carrying accelerometers and gyroscopes to indicate vertical displacement as well as pitch and roll. Pole and drogue-type instruments make use of the electrical conductivity of the sea to give wave height but not direction, the same task being accomplished by electrical resistance staffs fastened to permanent structures.

Also in use are electrical measuring techniques including capacitance or resistance-type probes. Pressure transducers have been employed to convert deflection of a diaphragm responsive to wave motion, into corresponding electrical signals. In other instances, wave measurement is carried out by combinations of instruments, such as dual-pressure transducers with vertical accelerometers.

While instruments heretofore developed to measure wave activity have been predicated on widely varying principles and have met with varying degrees of success, they have in all instances been characterized by a relatively high order of complexity and high cost. There has, therefore, been a longstanding need for a simple and inexpensive wave-measuring system which is of sufficient accuracy to afford the desired data of wave activity.

As yet there is no generally accepted method of determining wave heights from either single or multiple wave-height sensors, holography, radar, or other means, which satisfy conditions existing from one area of the world to another.

Moreover, in most instances, prior instruments required a stable platform serving as a reference with respect to which the measurement of wave activity is related. Where it is possible to undertake measurements from a shore installation or a rig fixed to the land or sea bottom, the problem is simplified, but in midocean or at isolated points at sea, one cannot provide a stable platform except by means of relatively complex gyro devices.

BRIEF DESCRIPTION OF THE INVENTION

In view of the foregoing, it is the main object of this invention to provide a wave-measuring system which is of simple design and yet capable of accurately and reliably measuring wave activity at any point on the sea without the necessity of relating the measurements to some point fixed with reference to land.

More specifically, it is an object of the invention to provide a wave-measuring system in which a simple accelerometer sensor encased in a canister is suspended well below the surface of the sea from a buoy whereby perturbation of the buoy by wave action is transferred to the canister to produce accelerometer readings which are a function of wave activity.

A significant advantage of the invention resides in the fact that because the sensor is suspended by a long lead well below the aero-hydro surface, undesirable effects, such as roll, pitch, yaw and surge, are minimized. Consequently, the flotation buoy at the surface transmits the actual vertical motion of an element of fluid in the interface, other extraneous motions being substantially attenuated by the long lead.

Also an object of the invention is to provide a self-contained, easily deployable wave-measuring instrument of the above-described type, which can be built at minimum cost, yet possessing the reliability needed for furnishing data for predicting virtually any sea state at any time or place.

Another important feature of the invention is that it lends itself to deployment by an inexperienced operator with minimal training.

Briefly stated, these objects are accomplished in a wave-measuring system constituted by an accelerometer sensor encased in a canister and suspended by a long lead well below the surface of the sea from a flotation buoy. The accelerometer is constituted by a cantilever beam anchored at one end and weighted at the other. Bonded to the beam are two strain gauges which are incorporated as arms in a Wheatstone bridge whose output is proportional to beam deflection, which in turn is proportional to vertical acceleration. The output of the bridge may be relayed by a conductor cable to a time-base recorder located aboard a ship to which the buoy is tethered, or the output may be used to modulate a radio transmitter housed in the buoy and serving to transmit signals to a remote recorder.

BRIEF DESCRIPTION OF THE DRAWING

For a better understanding of the invention, as well as other objects and further features thereof, reference is made to the following detailed description to be read in conjunction with the accompanying drawing:

FIG. 1 schematically shows one preferred embodiment of a wave-measuring system in accordance with the invention.

FIG. 2 is a longitudinal section taken through the canister and revealing the structure of the accelerometer sensor;

FIG. 3 separately shows the accelerometer assembly;

FIG. 4 is the electric circuit diagram of the system; and

FIG. 5 is a sample recording trace.

DESCRIPTION OF INVENTION

Referring now to FIG. 1, the principal components of a wave-measuring system in accordance with the invention are a canister 10 within which an accelerometer sensor is sealed, the canister being suspended well below the hydro-aero interface 11 by means of a long lead 12 extending from a spherical flotation buoy 13. In practice, buoy 13 may be made from styrofoam, lead 12 preferably being a stainless steel cable.

Perturbation of the buoy by wave action is transferred down to the canister. The acceleration sensed by the canister provides data from which the wave period and wave height are calculated. The electrical output of the accelerometer in the canister is conducted by an electrical cable 14 running along lead 12 and along a tether line 15 which ties buoy 13 to a ship 16. Cable 14 acts to connect the sensor to recording equipment and a power supply located on ship 16.

Referring now to FIG. 2, canister 10 is constituted by two matching sections, the upper half being in the form of a dome 17 which may be made of aluminum, and which is threadably attachable to a similarly-shaped ballast member 18 forming the lower half. A gasket 19 is interposed therebetween, whereby the accelerometer chamber 20 within chamber 20 within dome 17 is rendered watertight. Canister 10 is suspended by means of a suspension eye 21. To prevent corrosion, the entire canister assembly may be dipped in an epoxy compound.

Mounted below a platform 22 supported on brackets within chamber 20, is an accelerometer comprising a cantilever beam 23 extending in the horizontal plane from a supporting post 24, the free end of the beam having a weight 25 thereon. Beam 23 is a leaf-spring which may be fabricated of phosphor bronze, beryllium-copper, stainless steel, or any other material having suitable spring properties.

The accelerometer acts to measure acceleration in the vertical plane only, for weight 25 is subject to gravity in a direction normal to the neutral axis of the beam. Lead is preferably used as the concentrated weight due to its high density and ease of fabrication. The cantilever beam is caused to bend in a downward direction as the canister is raised by the buoy, and in the upward direction as the canister is lowered.

Lead 12 is about 50 feet long, so that the canister is displaced a considerable distance from the hydro-aero interface. Thus while the buoy not only rides up and down with wave motion, it is also subject to roll, pitch, yaw and surge, and these undesirable motions are attenuated by the long lead, which essentially transmits the actual vertical motion to the canister, the extraneous motions being effectively filtered out. The ballast serves to maintain the canister in the vertical position so that the motion thereof is exclusively along the vertical axis.

Bonded to the top side of beam 23 is a strain gauge 26, and bonded to the bottom side is a strain gauge 27. Such gauges, which, per se, form no part of the invention, make use of a wire or grid whose electrical resistance is caused to change as a function of the strain imposed thereon, for when a wire is stretched, its length and diameter are altered, with a resultant change in its ohmic value.

Downward bending of the beam produces a tension strain on top gauge 26 and a corresponding compression strain on bottom gauge 27, the reverse being true when the bend is upward. Hence as one gauge is caused to increase in resistance, the other decreases in resistance an equivalent amount, the extent of change depending on the degree of bend.

The theoretical relationship between the natural frequency of the weighted cantilever beam and the strain gauge assembly, has been found to be based on the following equation:

$$*W_n = \frac{\frac{1}{2}\sqrt{Ebt^3}}{\sqrt{ml^3}}$$

*neglecting beam weight

Where: $W_n$ = natural frequency (rad/sec.)
$t$ = beam thickness (inches)
$m$ = concentrated mass (ounces)
$l$ = beam length (inches)
$E$ = modulus of elasticity (p.s.i.)
$b$ = beam width (inches)

Because of practical size limitations of the canister, the maximum and optimum length of the cantilever beam was found to be 2.5 inches. It is important that the natural frequency of the beam assembly be such as to be well above frequencies normally encountered in wave analysis (0.25 rad/sec. in 50-foot waves, to 2.0 rad/sec. in 2-foot waves). In this way the beam response is substantially linear throughout the expected frequency range or periodicity of wave activity.

In an actual embodiment of an accelerometer, as shown in FIG. 3, the dimensions are as follows:

$t$=0.025
$b$=0.5 inch
$m$=1.75 ounces
$l$=2.5 inches
$E$=14.5×10$^6$ p.s.i. (Beryllium-Copper)
$W_n$=rad/sec.

Mounted on a circuit board 28 supported on posts 29 and 30, is a Wheatstone bridge. As shown in FIG. 4, gauge 26 is connected in one branch of the bridge having a fixed resistor 31 therein, while gauge 27 is connected in a parallel branch having a fixed resistor 32 therein, the bridge including a balancing potentiometer 33.

The input diagonals of the bridge are connected through cable 14 to a battery 34 (6 volts) on the ship, whereas the output diagonals are connected to a suitable DC recorder 35. The accelerometer senses the acceleration in the form of a change in the electrical unbalance of the bridge circuit, the output signal of which is a variable voltage corresponding to the bridge unbalance, which depends on wave motion.

When the two strain gauges have the same resistance value, the bridge is in balance and no output is produced (null). If the gauges are temperature-sensitive, they both change in resistance to the same degree; hence the bridge remains in balance and is insensitive to temperature effects.

When, however, beam 23 bends, one gauge undergoes a negative change in resistance, and the other a positive change, the resultant bridge unbalance depending on the difference in values of the two gauges, thereby rendering the accelerometer highly sensitive to flexing of the beam in either direction. The recorder, which may be calibrated in terms of wave height, provides the desired reading.

Consequently, when the buoy rises and falls in response to wave motion, the accelerometer affords a positive reading above the null value, depending on the height of the wave crest, and when the buoy falls, the device affords a negative reading depending on the depth of the wave trough. Instead of telemetering by lines, as shown, the buoy may be provided with a radio transmitter whose carrier is modulated by the accelermeter signal for transmission to a remote site. Because of the exceptional simplicity of the accelerometer structure, it may be mass-produced at very low cost.

FIG. 5 shows a sample strip chart recording over a zero to 45-second scale plotted against a zero to 1.5 millivolt output scale. This trace is representative of waves of 12 to 18 inches. In practice, the time-base recorder may be any standard type of paper-strip recorder of suitable sensitivity, to measure a 20±0.1 millivolt input, with the graph on the paper preprinted to indicate wave height directly.

It is also possible to provide an "in situ," self-contained recording system on the buoy rather than on the ship, and later retrieve the recording from the buoy.

While there has been shown and described a preferred embodiment of an aero-hydro interface measuring system in accordance with the invention, it will be understood that many changes and modifications may be made therein without, however, departing from the essential spirit of the invention.

I claim:
1. An aero-hydro interface system comprising:
   A. a buoy adapted to float on water and responsive to wave motion thereof,
   B. a canister suspended by a lead from said buoy by a distance therefrom which is sufficient to render said canister substantially insensitive to motion other than the vertical motion of said buoy,
   C. an accelerometer disposed in said canister and including a cantilever beam anchored on one end and weighted on the other to cause said beam to bend in response to said vertical motion, the natural frequency of said beam exceeding the normal frequency range of wave motion, a strain gauge assembly secured to said beam, and circuit means including said gauge assembly to produce an output signal which is a function of said vertical motion, and
   D. means coupled to said accelerometer to transmit said signal to a remote site.

2. A system as set forth in claim 1, wherein said canister is constituted by two separable halves, the upper half including a chamber to enclose said accelerometer, the lower half being formed by a ballast.

3. A system as set forth in claim 1, wherein said strain gauge assembly includes a pair of gauges disposed in opposite faces of said beam, and said circuit means includes a Wheatstone bridge incorporating said gauges whereby said bridge is in balance only when the beam is unbent.

4. A system as set forth in claim 1, wherein said lead is a stainless steel cable.

5. A system as set forth in claim 1, wherein said buoy is tethered to a ship having a recorder therein, means being provided to conduct the output of said bridge to said recorder.

6. A system as set forth in claim 5, wherein said recorder is voltage-responsive and is calibrated in terms of wave height.

7. A system as set forth in claim 1, wherein said means to transmit said signal includes a radio transmitter disposed in said buoy to generate a radio carrier modulated by said signal.

8. A system as set forth in claim 1, wherein said buoy is a sphere of styrofoam.